United States Patent [19]

Nakajima et al.

[11] 4,076,045
[45] Feb. 28, 1978

[54] SOLENOID OPERATED VALVE

[75] Inventors: Hiroyuki Nakajima, Ashiya, Japan; Takashi Hosokawa, No. 43, Nishimagawa-cho 6-chome, Higashisumiyoshi, Osaka, Japan

[73] Assignees: Konan Electric Co., Ltd., Nishinomiya; Takashi Hosokawa, Osaka, both of Japan

[21] Appl. No.: 710,048

[22] Filed: Jul. 30, 1976

Related U.S. Application Data

[63] Continuation of Ser. No. 566,575, Apr. 8, 1975, abandoned.

[30] Foreign Application Priority Data

Nov. 27, 1974  Japan .................. 49-144715

[51] Int. Cl.² .......................................... F16K 31/06
[52] U.S. Cl. ..................... 137/625.65; 251/139; 251/141
[58] Field of Search ................ 137/625.5, 625.65; 251/139, 141, 129

[56] References Cited

U.S. PATENT DOCUMENTS

| | | | |
|---|---|---|---|
| 2,914,034 | 11/1959 | Becker | 251/141 X |
| 2,947,284 | 8/1960 | Nicholson | 251/139 X |
| 3,529,620 | 9/1970 | Leiber | 137/625.65 X |
| 3,817,488 | 6/1974 | Mack | 251/139 X |
| 3,921,670 | 11/1975 | Clippard et al. | 251/129 X |
| 3,926,405 | 12/1975 | Arnold | 251/129 |

FOREIGN PATENT DOCUMENTS

| | | | |
|---|---|---|---|
| 1,285,270 | 12/1968 | Germany | 251/139 |
| 1,264 | 2/1966 | Japan | 137/625.65 |
| 1,380,826 | 1/1975 | United Kingdom | 251/129 |

*Primary Examiner*—Arnold Rosenthal
*Attorney, Agent, or Firm*—Sughrue, Rothwell, Mion, Zinn and Macpeak

[57] ABSTRACT

A solenoid operated valve has a valve body forming a chamber provided with a valve seat at its center. A fluid port communicating to an aperture formed in the center of said valve seat and another fluid port communicating to said valve chamber through a passage. An electromagnet body of a ring shaped cross section is mounted to the valve body from above overlying the valve chamber. The electromagnet body is divided by a central yoke and an outer enclosure formed with an outer yoke at its end facing said valve chamber. The lower ends of said central yoke and that of said outer yoke have tightly fit therebetween a lower flange of a solenoid coil bobbin of inserted in the coil chamber, formed thereby and seals off the valve chamber from the coil chamber. A movable block having a valve located at its center within said valve chamber is, normally, forced downwards by way of a spring to close off said valve seat and is attracted, when said coil is energized, toward said central yoke and said outer yoke to open said valve seat.

2 Claims, 1 Drawing Figure

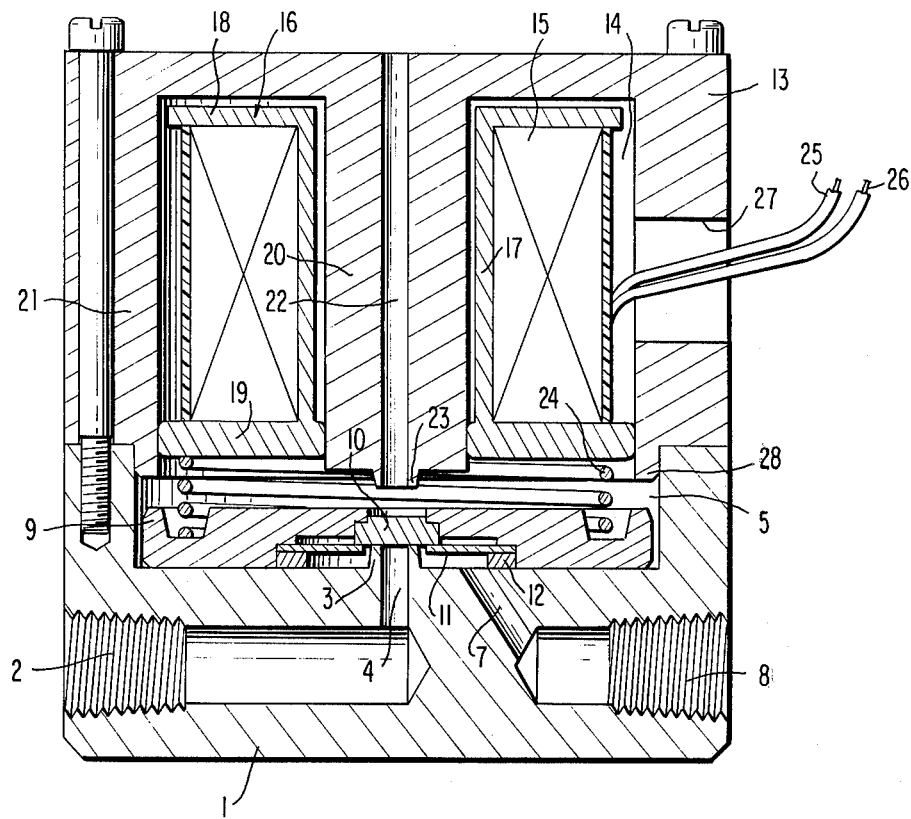

SOLENOID OPERATED VALVE

This is a continuation of application Ser. No. 566,575, filed Apr. 8, 1975, now abandoned.

BACKGROUND OF THE INVENTION

This invention relates to an improvement in a solenoid operatecl valve. The inventors already accomplished an invention regarding solenoid operated valve which provided a basic conception of the present invention and it was patented as Japanese Pat. No. 479,023 (refer to Japanese Patent Publication No. 1264/1966).

Based on the basic concept of the above patented invention, the present invention provides preferred embodiments thereof which are extremely simple in structure and capable of providing reliable technical effects as compared with any solenoid operated valve devices in the prior art. Numerous characteristic advantages can be obtained by practicing this invention such as simple structure, lower cost, ease of manufacture, higher reliability, longer service life and the likes.

BRIEF DESCRIPTION OF THE DRAWING

This invention will now be described in detail by way of its preferred embodiment referring to the accompanying drawing, wherein the single FIGURE thereof shows a vertical section of a preferred embodiment of the present invention.

DESCRIPTION OF THE PREFERRED EMBODIMENT

In the FIGURE, reference numeral 1 denotes a valve body provided with a fluid port 2 communicating with passage 4 which is formed in the center of a valve seat 3 situated at the center of the valve body 1. A valve chamber 5 is formed about the valve seat 3 within valve body 1 as illustrated in the figure, and said valve seat is situated in the center of the lower part of the valve chamber 5. The valve chamber 5 communicates by way of a passage 7 to another fluid port 8.

A movable block 9 is placed within the valve chamber 5 and is movable up and down, and said block 9 has a valve 10 at the center thereof. In the illustrated embodiment, the valve 10 is forced against the movalbe block 9 by a leaf spring 11, which is secured to the movable block by way of a metal retaining piece 12.

An electromagnet body 13 is provided above the valve body 1. The electromagnet body 13 is of U-shaped section as illustrated, that is, a coil chamber 14 of cylindrical configuration is formed within said electromagnet body 13, opening to the end of the main body 1 and adjacent to the valve chamber 5. The relation between the configuration of said electromagnet body 13 and that of a lower flange 19 of a solenoid bobbin 16 to be described just below, forms one of the essential factors which constitute the present invention.

Coil 15 is wound around the bobbin 16 comprising a cylindrical portion 17 to be fitted to a center fork 20 formed by the provision of the cylindrical coil chamber 14 within the electromagnet body 13, and to upper and lower flanges 18 and 19 of ring shape. The solenoid bobbin 16 is mounted within said coil chamber 14.

The turns of coil 15 are wound in layers around the outer surface of the cylindrical portion 17 of the bobbin 16. The lower flange 19 of the bobbin 16 is designed so that it has a cross section slightly smaller at its inner side and greater at its outer side relative to that of the coil chamber 14. Its cross section usually takes the shape of a circular ring corresponding to the cylindrical shape of the coil chamber 14. However, the coil chamber 14 may take, in its cross section, the form of a square ring not necessarily limited to the circular ring. The upper flange 18 is not particularly limited with respect to the size and shape thereof so long as it can easily be mounted within the coil chamber 14.

The coil bobbin is usually composed of an insulating material such as plastics, etc. but it may be made of a metal and the like.

Since the coil chamber 14 is made cylindrical by forming a recess in the electromagnet body 13 from the side of the valve chamber 5, the bobbin 16 having coil 15 wound therearound can be inserted into the coil chamber 14 and then the lower flange 19 may be tightly fitted over the central yoke 20 and to an inner surface of the outer enclosure 21 of the electromagnet body 13. In the illustrated embodiment, the central yoke 20 is apertured with a passage 22 through its center and formed with a valve seat 23 at its lower end facing the valve chamber 5.

The lower end of the outer enclosure 21 partially extends to the valve chamber 5 and forms an outer yoke 28.

The movable block 9 placed in the valve chamber 5 is usually forced downwards by the spring 24 and closes the valve seat 3 by means of the valve 10 provided at the center thereof.

Incoming fluid flowing through the port 2 is checked usually by the valve seat 3 and the valve 10. Both ends 25 and 26 of the coil 15 are led outwards as illustrated through an aperture 27 provided in a part of the outer enclosure 21.

The aperture 27 should be situated above the position where the lower flange 19 is to be fitted.

When electric current is fed to the coil 15 through the ends 25 and 26, the electromagnet body 13 is energized to act as an electromagnet and attracts the movable block 9 to its central yoke 20 and outer yoke 28 against the resilient force of the spring 24. The valve 10 is so designed regarding its size that it contacts and closes off the valve seat 23 of passage 22 when the block 9 is attracted upwards. Thus, when energized, the valve seat 23 is closed off while the valve seat 3 is opened, whereby the fluid flows from the port 2 to the port 8. Thus, when the current is interrupted, the electromagnetic force disappears and the block 9 is forced back downwards by the force of the spring 24 thereby closing off the valve seat 3 by means of the valve 10 to check the flow of the fluid. In the structure of the illustrated embodiment, the fluid port 8 and the passage 22 are then communicated with each other to provide a three way valve function. Without the provision of the passage 22 and the valve seat 23, the three way valve function can not of course be attained.

In the solenoid operated valve of the foregoing structure and construction, the intrusion of the fluid in the valve chamber 5 into the coil chamber 14 can be prevented by merely fittedly inserting the lower flange 19 of the coil bobbin 16 to the lower end of the coil chamber 14.

In the solenoid operated valves of the prior art, it is required to use packing or a non-magnetic bobbin such as stainless steel, or a structure having a partition membrane in order to prevent the leakage in the engaged portion, which makes the valve structure complicated and increases manufacture cost as compared with the magnetic valve of this invention.

In the present invention, a magnetic body 13 has a coil chamber 14 recessed therein from the side of a valve chamber 5, so as to form a central yoke 20 at the central portion and an outer enclosure 21 at the outer portion in an intergrated manner and when inserting the coil bobbin 15 into the coil chamber 14, tight seals are established between the lower flange 19 of said bobbin 16 and the inner side of the outer housing 21 and the outer side of the central yoke 20 of the electromagnet body 13, thereby preventing the passage of of fluid between the coil chamber 14 and the valve chamber 5 while the outer yoke 28 and central yoke 20 of the electromagnet body 13 face the valve chamber 5. This provides a solenoid operated valve capable of closing and opening the passage of fluid of large capacity and high pressure with a simple structure and at lower electric power.

The effect of this invention is extremely outstanding such as reducing the valve weight to ½ and manufacture cost also to ½ as compared with conventional solenoid operated valves.

This invention further provides an additional effect that synthetic resin capable of cure aging such as two pack epoxy resin can be poured through the aperture 27 and impregnated into the coil 15 for improving the insulation and heat dissipation of the coil.

While in the conventional solenoid operated valves, the coils should once be placed in the mold, impregnated with resin and then mounted to the solenoid operated valve, such molding step is not necessary in the resin impregnation of the solenoid operated valve of this invention and the numbers of the fabrication steps can be decreased.

What is claimed is:

1. A low cost, low power, solenoid operated valve comprising:

a two part valve housing,
    said valve housing consisting of end-to-end sealably joined annular valve and electromagnet bodies, said valve body being of U-shape in vertical cross-section and defining a central, circular valve chamber, said electromagnet body being of E-shape in cross-section and defining integral central and outer yokes forming an annular coil chamber,
    means for sealably connecting said valve bodies together at their peripheries with said chambers facing each other and with the ends of said central yoke and that of said outer yoke extending to said valve chamber,
    a cylindrical solenoid coil bobbin including integral, inner and outer flanges at opposite ends and carrying a coil wrapped about said cylindrical coil bobbin between said flanges, said bobbin being disposed within said coil chamber, the inner flange relative to said coil chamber having a radial width less than that of said coil chamber and at least a part of said outer flange having a radial width in excess of that of the coil chamber and being tightly fitted within said coil chamber to render said coil chamber fluid tight to prevent the passage of fluid between said valve and coil chambers,
    an annular movable valve block positioned within said valve chamber and having a diameter such that its periphery extends to said outer yoke and being located at the center of said valve chamber, said valve body being provided with a first valve seat at the center of said valve chamber,
    a first fluid port within said valve body communicating to an aperture formed in the center of said valve seat,
    a second fluid port within said valve body communicating to said valve chamber through a passage within said valve body,
    a spring biasing said movable block away from said yokes to close said first valve seat aperture and being attracted, when said coil is energized, towards said central yoke and said outer yoke to provide a low magnetic impedance path through contact of said block at its center with the central yoke and at its periphery with the outer yoke and to readily open the valve seat aperture under low current to said coil against the bias of said spring.

2. The valve as claimed in claim 1, further comprising a fluid passage extending through the center of said central yoke with said center yoke forming a second valve seat facing said movable valve block within said valve chamber.

* * * * *